E. H. WHITNEY,

Assignor to DOVER STAMPING COMPANY.

Match-Safe.

No. 8,621. Reissued Mar. 11, 1879.

WITNESSES

A. J. Oettinger,

Geo. F. Walker

INVENTOR

Edward H. Whitney by his atty

Charles H. Raymond

N. PETERS, PHOTO-LITHOGRAPHER, WASHINGTON, D. C.

UNITED STATES PATENT OFFICE.

EDWARD H. WHITNEY, OF CAMBRIDGE, ASSIGNOR TO DOVER STAMPING COMPANY, OF BOSTON, MASSACHUSETTS.

IMPROVEMENT IN MATCH-SAFES.

Specification forming part of Letters Patent No. 169,129, dated October 26, 1875; Reissue No. 8,621, dated March 11, 1879; application filed February 7, 1879.

*To all whom it may concern:*

Be it known that I, EDWARD H. WHITNEY, of Cambridge, Massachusetts, assignor to the Dover Stamping Company, have invented an Improvement in Match-Safes, of which the following is a specification:

This invention relates to the making of match-safes. By the practice of it a match-safe is produced cheap, ornamental, strongly put together, in which the parts are thoroughly and firmly united without solder, and all of them formed by dies, stamps, and beaders usual in tinner's machinery.

Figure 1:
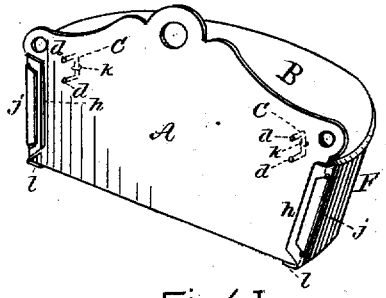
Figure 2:
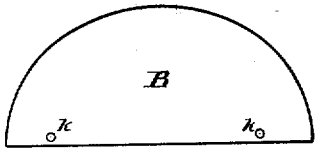
Figure 2:
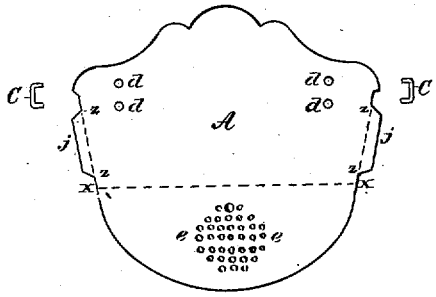
Figure 2:
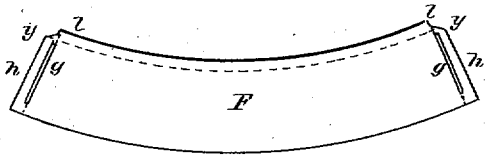

In the drawings, Figure 1 is a perspective of the complete safe; and Fig. 2 is a series of detached views of the several parts going to the composition of the box, with their details.

A is a piece making the back and bottom of the box. It is stamped out of the shape shown in Fig. 2, and is creased along the dotted lines *x x* and *z z*, so as to bend it at right angles along the line *x x*. A roughness, *e e e e*, is stamped in the bottom to scratch the matches upon, much like the surface of a nutmeg-grater. Two ears, *j j*, are formed on the sides, as shown, which serve as part of the locking device, and the creases at *z z* determine the line of bend.

The cover B is also stamped out of tin or sheet metal, is rounded up and beaded, so as to form a neat job and tight joint at the front edge, and two holes, *k k*, are made in the rear edge of the cover. Staples C C pass through these holes in the cover, and are attached to the back plate, A, by passing their ends through holes *d d d d*, and soldering or riveting on the back side. The front-plate, F, is shaped as in Fig. 2, and has slots *g g* at each end, beyond which the ears *h h* are formed by creases, continuing the line of the slots *g* to the upper and lower edges. A crease is also laid in along the line *y y*, and the lip *l* bent inward at right angles along this line. The piece F is bent to form the front of the box, the bottom inserted within the angle formed by lip *l*, the ears *j* put through slots *g*, and the ears *h* and *j* bent inward and downward upon back A, locking all together.

By making the top B domed the cover cannot be left open, because the staple-hinges C K are of such a character that the doming of the top always gives it a preponderance forward, and if left to itself it will shut.

It will be observed that the parts comprising the back, bottom, and front of the box are stamped from tin or sheet metal to correspond and conform to each other in general dimensions and outlines, so that when the bottom is bent to the proper angle in relation to the back and the front curved the parts shall be in proper position to be fastened.

It will be observed, further, that the back and bottom of the box are shaped from one piece.

Having thus fully described my invention, I claim and desire to secure by Letters Patent of the United States—

1. As a new article of manufacture, a box whose sides, back, bottom, and top are composed of the pieces A B F, arranged and combined together by slots *g g* and ears *h j*, substantially as and for the purposes described.

2. A sheet-metal match-box whereof the back, bottom, and front, A F, are shaped and combined together substantially as described, the back and bottom in one continuous piece, and bent at the junction of back and bottom, and the front conformed to the edges of the bottom, and fastened to ears projecting from the back, substantially as described.

3. A sheet-metal match-box whereof the back and bottom are composed of one piece, and the front is adapted to conform to and lap upon the edge of the bottom piece, substantially as described.

4. A sheet-metal match-box whereof the back and bottom are composed of a single piece, and the front is adapted to conform thereto, and is provided with ears for fastening the front to the back by lapping upon the same, substantially as described.

EDWARD H. WHITNEY.

Witnesses:
A. L. HOLLANDER,
GEORGE W. BARNES.